J. F. GAIL & O. RUDD.
TUBE AND PROCESS AND APPARATUS FOR MANUFACTURING SAME.
APPLICATION FILED MAY 1, 1915.
1,172,699.
Patented Feb. 22, 1916.
3 SHEETS—SHEET 3.
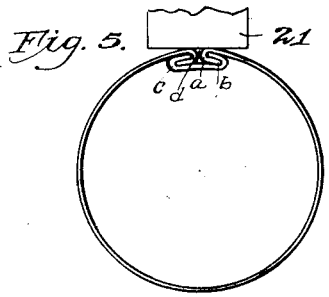
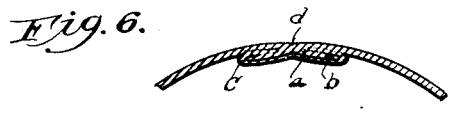
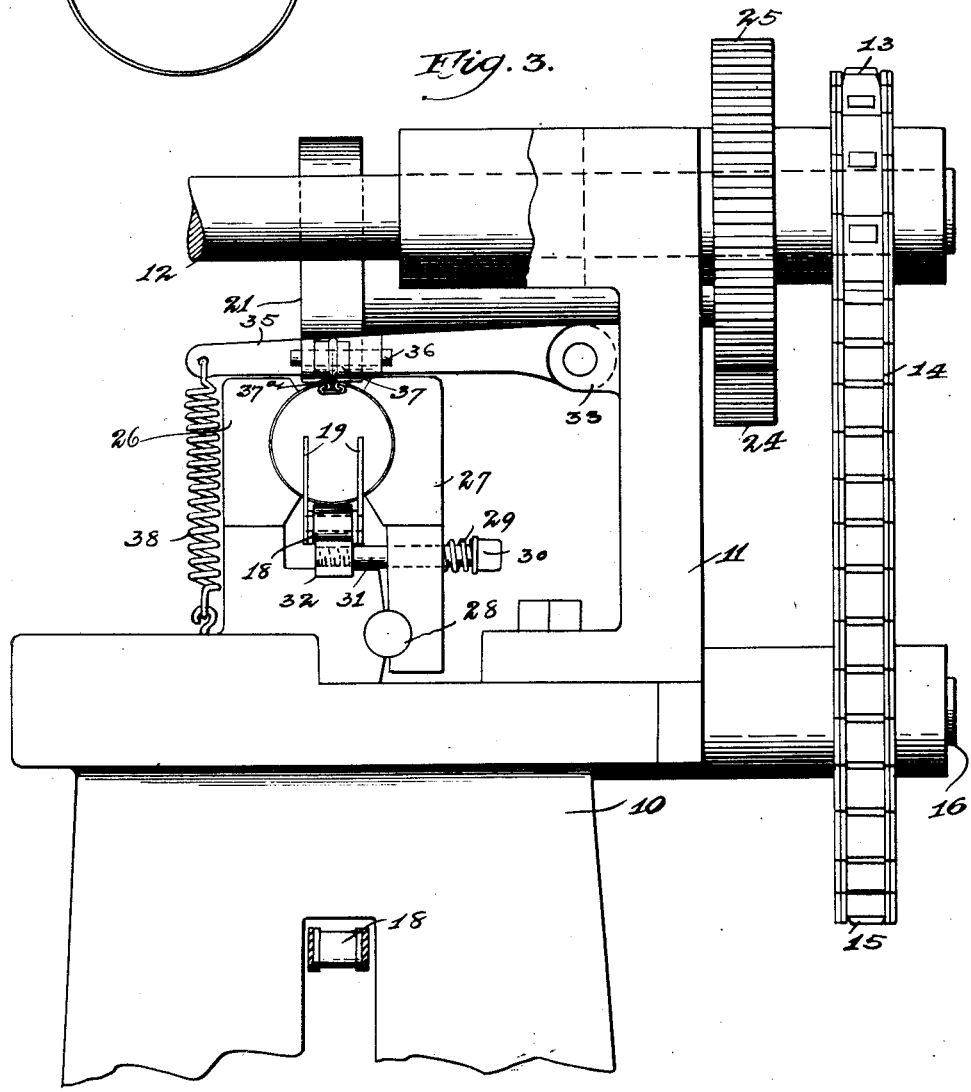

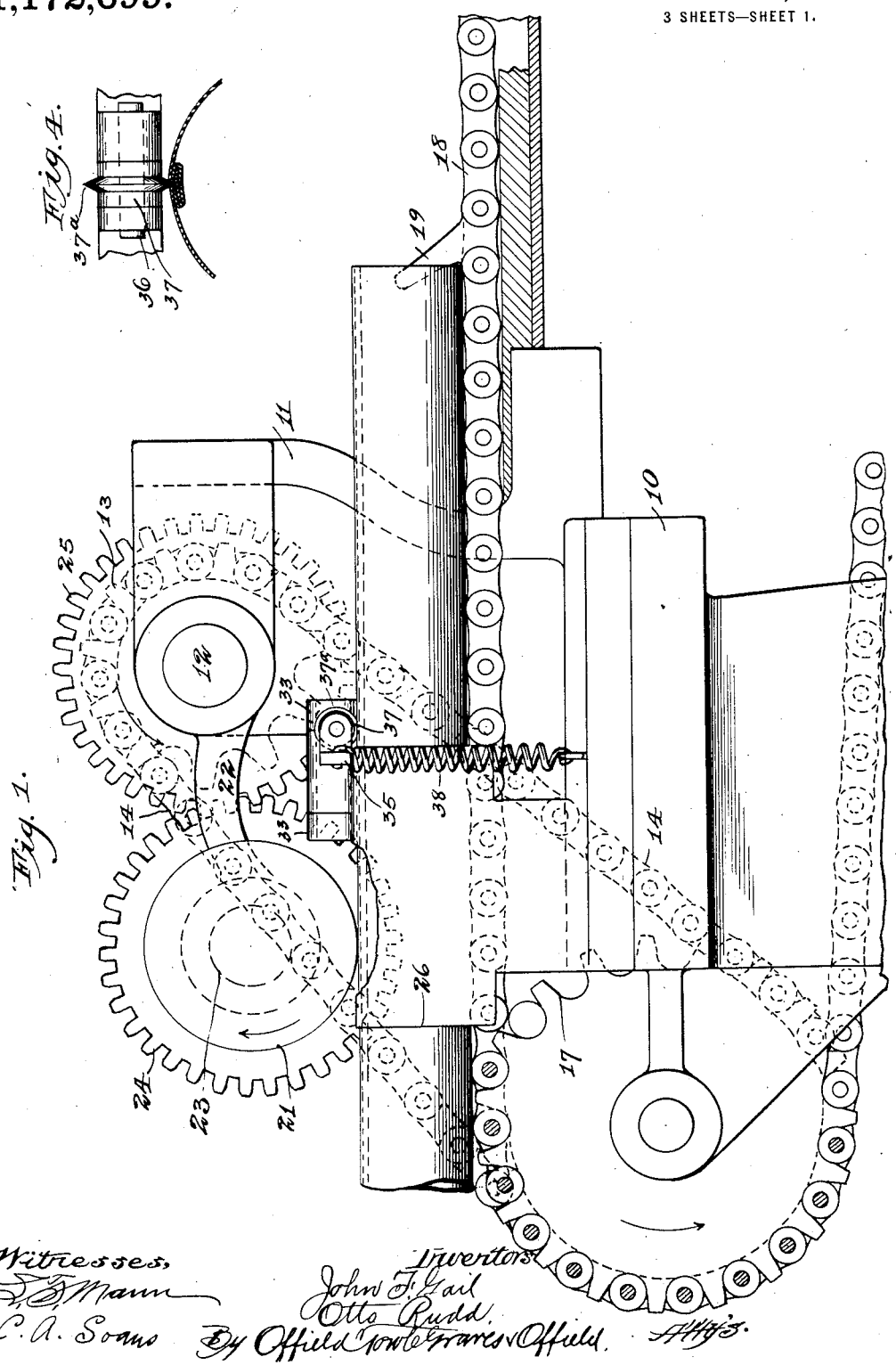

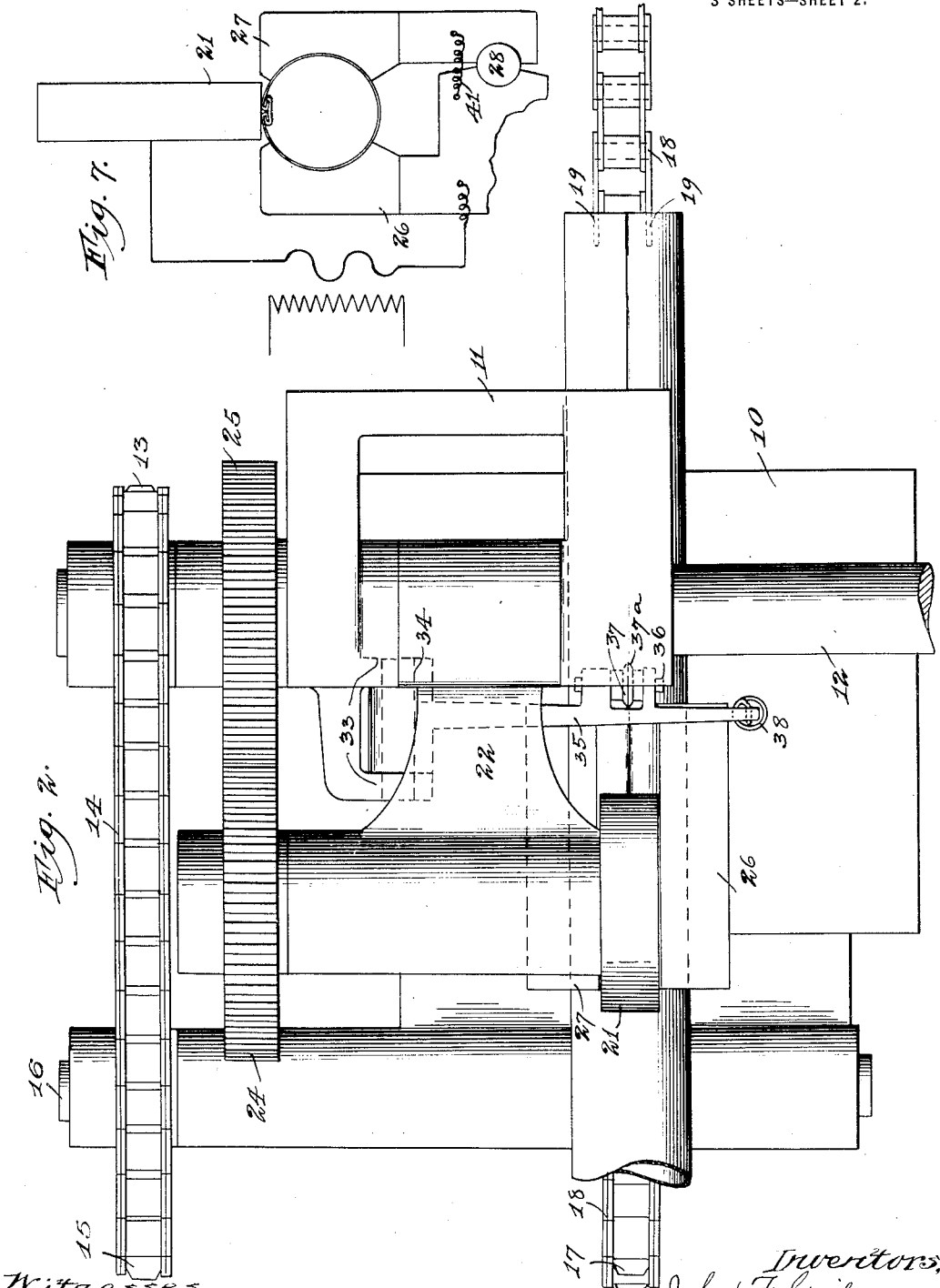

UNITED STATES PATENT OFFICE.

JOHN F. GAIL AND OTTO RUDD, OF KENOSHA, WISCONSIN, ASSIGNORS TO THE SIMMONS MANUFACTURING COMPANY, OF KENOSHA, WISCONSIN, A CORPORATION OF WISCONSIN.

TUBE AND PROCESS AND APPARATUS FOR MANUFACTURING SAME.

1,172,699. Specification of Letters Patent. Patented Feb. 22, 1916.

Application filed May 1, 1915. Serial No. 25,324.

*To all whom it may concern:*

Be it known that we, JOHN F. GAIL and OTTO RUDD, both citizens of the United States, residing in the city of Kenosha, county of Kenosha, and State of Wisconsin, have invented certain new and useful Improvements in Tubes and Processes and Apparatus for Manufacturing Same, of which the following is a specification.

Our invention pertains to thin-walled tubing of steel or other metal formed from strip sheet-metal stock having its edges united by a seam formed of plural thicknesses or plies of metal.

According to this invention the external longitudinal seam-cleft of tubes thus formed is closed by a process of autogenous welding in such manner as to produce a tube which is externally seamless, and the tube wall of which is circumferentially continuous and homogeneous in structure.

In the preferred embodiment of the invention the closing of the external cleft is accomplished by electric welding. The metal serving to close the cleft may be derived wholly from the adjacent portions of the tube wall, or partly or wholly from a fillet, strip or wire of the same or essentially similar metal, the closure in either case being autogenous in character and the finished tube wall essentially homogeneous in structure.

In the practice of our invention we employ electric welding as the final or perfecting step of our improved process. Seamed tubing electrically welded is not new. Heretofore it has been common to butt weld the edges of relatively thick-walled tubing blanks to close the seam of the tube. It has also been proposed to modify the butt welding method by interposing and welding an inset section of metal between the edges of the tube blank proper. Attempts to electrically butt-weld thin gage tubing have been practical failures and it is not to be had as a commercial article. In such attempts it has been found that on account of the relative thinness of the wall the tube is liable to deformation under the welding conditions along the line of the weld; and moreover, in case the temperature reaches the fusing-point of the metal at the cleft line, the fused metal cannot be properly retained in position while it re-solidifies. For these reasons it has heretofore been impracticable to produce a thin-walled, seamed tubing in which the external tube portions adjacent the seam are autogenously united into practically seamless continuity. According to the present invention these difficulties are avoided by bridging the cleft line by a metal member which not only supports the edges of the cleft line against deformation under the pressure of the welding contact, but also retains the fused metal until re-solidification occurs, this metal member being incorporated into the seam during the welding operation, and remaining as an element of the product. The application of this discovery or invention finds one of its most important fields in the perfecting of the seams of lock seam and analogous thin gage tubing. Lock seamed tubing is, of course, a typical example of a metal article having a cleft line or joint constituting a gap which is short circuited by the metal of the interlocked parts in such manner as to form a path of very low resistance around the gap. Thin-walled lock-seamed tubing having the seam welded is, we believe, a new article of manufacture first produced by us.

The peculiar manner in which the lock seam is formed is not essential, as will be readily understood when the invention has been more fully described, and therefore that step of the process which consists in forming the blank into tubular form and lock seaming the edges together may be carried out in any suitable known way. For example, the tubing which is now being largely manufactured, like that shown in the patent to Wilmot No. 625,946, except that the so-called "metal packing" is dispensed with, is a lock seam tubing suitable for being made into the perfected welded tubing constituting the new article of manufacture described and claimed herein. Accordingly the drawings of the present application illustrate only such apparatus as is used in effecting the welding of the seam after it has been prepared as lock-seam stock tubing.

Among the salient objects of our invention are to so weld together the contiguous parts of the portions of a tube wall through which a lock seam extends as to practically eliminate the external cleft line of the seam; to accomplish this welding in such manner that the strength of the tube is not impaired but on the contrary is increased; to produce as a new article of manufacture lock seam tubing having the seam so strengthened by welding as effectually to hold the adjacent parts against relative longitudinal displacement, even when subjected to severe torsional or bending strains; to provide a process adapted for making externally-seamless tubing of very thin gage stock; to provide a process which may be carried out with automatic, or semi-automatic, machinery, the welding being accomplished progressively as the tube stock is fed through the welding machine; to provide a process which is susceptible of application to the welding of tubings of different cross sectional shapes and sizes and of different specific constructions as regards the seams; and in general, to provide an improved type of tubing and improved processes for making such tubing.

Our invention will be readily understood by reference to the accompanying drawings, in which—

Figure 1 is a side elevation of a suitable and preferred apparatus for performing the welding step of our new process; Fig. 2 is a plan view of the apparatus shown in Fig. 1; Fig. 3 is an end elevation, looking from the right-hand side of Fig. 1; Fig. 4 is a fragmentary cross sectional view of a portion of tubing and the centering device of the tube feeding mechanism, showing the relation of these parts; Fig. 5 is another cross sectional view showing the relation of the electrodes to the tube during the application of current and welding; Fig. 6 is a diagrammatic fragmentary cross sectional enlarged detail of a typical finished seam of the tubing; Fig. 7 is a view showing the relations of the electrodes to the tubing and the electric circuit connections, the latter being shown diagrammatically.

In the drawings, 10 is the main base casting of the machine, upon which is secured a bracket 11 in which is journaled a main drive shaft 12 positively driven from any suitable source of power. Said shaft carries a sprocket 13 keyed thereto, and which is belted by a sprocket chain 14 to a larger sprocket 15 keyed on a shaft 16 journaled in the left-hand side of the upper portion of said base casting 10. On said shaft 16 is secured a feed chain sprocket 17, which drives an endless feed chain 18 which extends to the left a sufficient distance to accommodate the greatest length of tubing the machine is designed to handle. It is to be understood that the farther end of said feed chain passes over a suitably supported idler sprocket similar to the sprocket 17. At suitable intervals on said feed chain are pairs of prongs 19 which project forward in the direction of movement of the chain and radially outward, so as to engage the rear end of each tube section to feed it forward.

In making tubing, we prefer to use lock-seam tubing of the type best shown in Fig. 5; but any suitable form of lock-seam or cross sectional shape of tubing may be welded. We also prefer to form up the tubing from strip blanks by means of separate folding and interlocking apparatus, although it should be understood that the lock-seam folding apparatus and the welding mechanism herein illustrated may be combined into one machine if it be thought desirable.

In order to carry out the perfecting step of the process, i. e., to complete the mechanically interlocked but otherwise raw lock-seam tube, we electrically weld the edges of the seam together in such manner as to eliminate the seam line cleft and make the tube exteriorly seamless. The welding is performed progressively. A section of tubing mounted on the feed chain 18 is forced at a regulated speed through a split welding shoe consisting of the parts 26, 27, with which coöperates a welding or contact roll 21. This welding roll is desirably driven at the same peripheral speed as the linear speed of the tube in its movement with the conveyer chain. To this end we pivot upon the same axis as the shaft 12 a swinging arm or bracket 22, the outer end of which constitutes the journal for the welding roll shaft 23. The shafts 23 and 12 are geared together by spur gears 24 and 25, the pitch diameters of these gears being suitably proportioned so that the circumference of the welding roll will travel at the prescribed linear speed. It will be understood that the welding roll 21 is formed of copper, bronze or other suitable material having high conductivity, and is suitably insulated from the bracket arm 22 (the insulation not being shown) so that short circuiting of the current through the gears or shafts is avoided. The current may be conveyed to the welding roll 21 by any approved sliding contact or brush device. The necessary yielding contact pressure between the surface of the roll and the surface of the tube is furnished by the weight of pivoted parts, but if desired such weight may be supplemented by a spring. The welding roll bridges the seam, as will be hereinafter more particularly described.

The welding shoe, which is best shown in Fig. 3, is made of two parts, one of which, 26, is stationary, and the other, 27, movable. To this end said part 27 is pivoted upon a shaft 28, which fits in grooves formed in the opposed faces of the lower extensions of the two parts of the welding shoe. The part 27 is forced toward its mating half 26 by means of a spring 29, which is interposed between the outer faces of said part 27 and the head 30 of a stud or tap bolt 31, which is shown as secured in the side of the track member

32 which guides the feed chain; said member 32 being rigidly mounted upon, and secured to, the lower extension of the fixed welding shoe 26. The parts 26 and 27 are made of good conducting material, are desirably insulated from the main body of the machine (the insulation not being shown), and are connected electrically to one path of the welding transformer. The opposed surfaces of the upper parts of the welding shoe are suitably grooved out, as shown, to fit the sides of that size of tube for which the shoe is adapted, and thus, while serving to supply current to the tube, they embrace the same, prevent it from being distorted under the pressure of the upper welding roll 21, and also serve to guide said tube in its travel with the feed chain.

In order to center the seam cleft and guide it accurately beneath the welding roll 21, means are provided as follows: Upon the bracket 11 are cast two lugs 33, between which is pivoted on a shaft 34 a horizontally disposed arm 35. In the outer portion of this arm there is mounted to extend through suitable lugs a shaft 36, upon which rotates freely a small guiding roll 37, in the middle of the circumference of which is formed a knife-like guiding rib 37ᵃ (see Fig. 4) which is adapted to enter the seam cleft between the folded edges of the lock-seam and by engagement therewith center the seam relatively to the welding roll. The arm 35 is held in proper engagement with the tube by means of a coiled tension spring 38, one end of which is secured to the outer end of the arm and the other to a suitable stud on a lower part of the frame. Electrical connections are shown clearly in diagrammatic Fig. 7, it being noted that the welding roll 21 is connected to one pole of the transformer and the welding shoe 26, 27, to the other pole of the transformer. The two members of the divided shoe are electrically connected with each other, as indicated at 41.

Describing the mode of operation of the apparatus, a section of tubing having been placed with its end entering the welding shoe, its seam cleft engaged and centered by the guiding roll rib 37ᵃ, and its rear end engaged by a pair of supports 19, the machine is threaded so as to feed the tube forwardly at a rate of twenty or more feet per minute. As the tubing starts to feed forwardly, current is turned on to effect the welding. It will be noted that the periphery of the welding roll is of such shape that it forms practically a point contact with the tubing at each side of the cleft line and immediately adjacent thereto, as best seen in Fig. 5. The face of the welding roll shown is cylindric, and this form we have found best adapted for tubing of moderate diameter, but if the tubing to be welded should be of very large diameter, or of shape other than cylindric, the contacting face of the welding roll can be modified so as to insure that the contact engagement between the welding roll and the tubing shall be limited to points of small area, and these points immediately contiguous to the seam cleft. Of course, the progress of the tube through the machine insures a progression of the contact points along lines parallel with, and at each side of, the seam cleft. The current from the welding roll therefore enters the tubing at two points of very small area, and is thereby localized at its points of entrance to the metal which forms the walls of the cleft, with the result that these cleft walls and, of course, the portions of the tubing directly engaged by the contact wheel are rapidly softened, and in fact fused, by the current. The welding or fusing temperature thus localized in the walls of the cleft fuses the metal locally, and the combined action of the fusing of the metal and the weight of the welding roll thereon results in causing the metal to run together and fill up and eliminate the cleft; this, of course, being accomplished progressively. There is, of course, a flattening of the tube along the path of the welding roll, but this is so slight in ordinary practice as to be unnoticeable when the slight roughening incident to the action of the current on the metal has been dressed off.

Instead of deriving the metal which serves to fill or close the seam cleft wholly from the adjacent portions of the tube stock as in the process just described, it is advantageous in some cases to supply some or all of this metal by associating with the cleft a fillet, strip or wire of the same or essentially similar metal, and then autogenously welding the same with the walls of the cleft. This modified process is fully disclosed and claimed in our copending application Serial No. 25,325, filed on the same date herewith. Whether the metal for closing the cleft is derived wholly from the tube blank, or wholly from a fillet of the same or essentially similar metal, or in part from both sources, the finished tube is structurally essentially the same. The walls of the seam cleft are autogenously united into a structurally homogenous body having to all intents and purposes the same degree of strength and resistance to longitudinal displacement of adjacent parts as the other portions of the tube.

In actual practice tubing of 20 or 30 gage steel welded by this process, and subsequently polished off, presents a seamless surface so perfect in continuity and of such uniform texture that it is often impossible to detect the line of the seam by inspection with the naked eye. However, when we refer to the finished tube as externally seamless it is not thereby necessarily to be understood that no visible trace of the welding operation remains, but that the tube wall is, structurally considered, practically continuous and homogeneous.

The tubing produced in the manner described is not only to all intents and purposes seamless so far as presenting a perfect exterior is concerned, but is furthermore made absolutely rigid against movement of one seam part upon the other under torsional stresses. In the making of metal bedsteads and the use of lock-seam tubing in different arts which require that the tubing be furnished with an outside enamel or analogous finishing coating, the longitudinal displacement of one seam member upon another under twisting stresses has been a most serious defect. Such movement in the seam members incident to twisting, of course, breaks the enamel or analogous covering along the line of the seam, and no matter how perfectly the cleft may have been covered up its presence and position is instantly made apparent when the tubing has been thus distorted. Moreover, it is a matter of vital importance that in bending the seams shall not buckle or separate, and the greatest difficulty has been encountered in making tubular metal beds and analogous structures out of lock seam tubing because of the tendency of the seams to open and to buckle during bending of the tubing. This defect is, of course, wholly obviated in the new article of manufacture resulting from our present invention.

The structural relations between the unfinished and the finished tubes may be seen from Figs. 5 and 6, in which (*a*) represents the position of the infolded edges of the tube, the inturned portions (*b*) being united by the internal hooked strip (*c*) and the seam (*d*) closed by welding; the degree to which this structure is obliterated in the finished tube will of course depend upon the welding conditions.

Although we have described what we at present believe to be the best and preferred embodiment of our invention, and manner of carrying it into effect, yet it should be understood that many of the details of the invention in its several phases may be modified without departing from the spirit and substance of the invention.

We claim—

1. The improved process of making thin-walled metal tubing, which comprises forming a sheet-metal blank into tubular form, uniting the adjoining edges thereof into an internal, longitudinal, plural-ply seam having an external seam-cleft, and then closing said cleft by autogenous welding, whereby an externally seamless tube is produced, and the tube-portions abutting the union are held against relative longitudinal displacement.

2. The improved process of making thin-walled metal tubing, which comprises forming a sheet-metal blank into tubular form, uniting the adjoining edges thereof into an internal, longitudinal, plural-ply seam having an external seam-cleft, and then closing said cleft by electric welding, whereby an externally seamless tube is produced, and the tube-portions abutting the union are firmly held against relative longitudinal displacement.

3. The improved process of making thin-walled metal tubing, which comprises forming a sheet-metal blank into tubular form, uniting the adjoining edges thereof into an internal, longitudinal, plural-ply seam having an external seam-cleft, then autogenously uniting the walls of said cleft by causing portions of the metal of the tube adjacent said cleft to flow into and close the same, whereby an externally seamless tube is produced, and the tube-portions abutting the union are held against relative longitudinal displacement.

4. The improved process of making thin-walled metal tubing, which comprises forming a sheet-metal blank into tubular form, uniting the adjoining edges thereof into an internal, longitudinal, plural-ply seam having an external seam-cleft, then electrically heating the metal of the tube by sending current through the parts thereof adjacent said cleft to cause the metal to flow into and close the cleft, whereby an externally seamless tube is produced, and the tube-portions abutting the union are firmly held against relative longitudinal displacement.

5. The improved process of making lock-seam metal tubing which consists in forming up a strip of sheet metal into tubular cross section and uniting the edges thereof by folding into a lock-seam, then perfecting said seam by electric welding, said welding being effected by passing a heating current through the seam portions and localizing the chief flow of said current to those parts of the metal which bound and form the external seam-cleft line, whereby such heated portions are fused and merged together and close said cleft.

6. The improved process of making lock-seam tubing which consists in forming up a strip of sheet metal into tubular cross section, uniting the edges thereof by a lock seam, then perfecting said seam by electric welding, said welding being effected by passing a heating current through the seam portions and localizing the chief flow of said current to those parts of the metal which immediately bound and form the external seam cleft line, moving said tubing relatively to the current-applying electrodes so as to effect a progressive welding along said line, the rate of movement and the supply of current being regulated to effect a proper fusing of the walls of the cleft and merging together of the same.

7. The improved process of making metal tubing which consists in forming up a strip of sheet metal into tubular cross section and uniting the edges thereof by a seam formed of plural thicknesses or plies of metal, and perfecting said seam by electric welding, said welding being effected by passing a heating current through the seam portions and localizing the chief flow of said current to those parts of the metal which bound and form the external seam cleft line, whereby such heated portions are caused to soften, merge together and close said cleft.

8. The improved process of making thin-walled metal tubing which consists in forming up a strip of sheet-metal into tubular cross-section and uniting the edges thereof by a seam having an internal longitudinal rib underlying and closing the seam-cleft, and perfecting said seam by electric welding, said welding being effected by passing a heating current through the seam portions and localizing the chief flow of said current to those parts of the metal which bound and form the external seam-cleft line, whereby such heated portions are caused to soften, merge together and close said cleft.

9. The improved method of welding together the edges of a cleft line in a thin metal part, which consists in bridging the cleft line by a metal member in position to support said edges and to retain the fused metal, introducing electric current simultaneously at two limited-area points in immediate proximity to, and on opposite sides of, said cleft line, and conducting away said current through relatively low resistance paths, whereby the resistance is greatest at said limited-contact areas and fusing together of the walls of the cleft and incorporation of said metal member with the seam is effected.

10. The improved process of making thin-walled metal tubing, which comprises forming a sheet-metal blank into tubular form, uniting the adjoining edges thereof into an internal, longitudinal, plural-ply seam having an external seam-cleft, said seam underlying the cleft at both sides thereof, and then closing said cleft by autogenous welding, whereby an externally seamless tube is produced, and the tube-portions abutting the union are held against relative longitudinal displacement.

11. As a new article of manufacture, a length of thin-walled lock-seamed steel tubing having its lock-seam portions autogenously united and thereby relatively fixed against longitudinal movement upon each other.

12. As a new article of manufacture, thin-walled metal tubing having an internal, longitudinal, plural-ply seam, the external tube portions adjacent said seam being autogenously united into practically seamless continuity, and thereby firmly held against relative longitudinal displacement.

13. As a new article of manufacture, thin-walled metal tubing having an internal, longitudinal, plural-ply seam, and a circumferentially continuous and homogeneous tube-wall.

14. As a new article of manufacture, thin-walled welded metal tubing having an internal longitudinal seam, and a circumferentially continuous and homogeneous tube-wall, said seam underlying the line of the weld on both sides thereof and autogenously united with the tube-wall.

15. As a new article of manufacture, thin-walled welded steel tubing, having an internal longitudinal seam, and a circumferentially continuous and homogeneous tube-wall, said seam underlying the line of the weld on both sides thereof and autogenously united with the tube-wall.

16. As a new article of manufacture, thin-walled steel tubing having an internal, longitudinal, plural-ply seam, and a circumferentially continuous and homogeneous tube-wall.

17. As a new article of manufacture, a thin-walled sheet metal tube having infolded edges (a) slightly separated, the inturned portions (b) being connected by an internal hooked strip (c) and the external opposing margins of the sheet autogenously united to provide a closed seam (d), substantially as described.

18. In an apparatus for electrically welding tubing, the combination of a main frame, a conveyer mounted to travel thereon and adapted to positively carry endwise therewith a length of tubing, a two-part welding shoe, adapted to embrace and guide the tubing while traveling with said conveyer, a yielding contact device having a contacting face-configuration adapted to make extremely limited-area contact with a length of tubing at two points simultaneously, at points on each side of a longitudinal seam-cleft in the tubing, and means for conducting heating current from a suitable source of supply through said yielding contact device to the tubing at said limited points of contact only.

19. In an apparatus for electrically welding tubing, the combination of a main frame, an endless-chain conveyer mounted to travel thereon and adapted positively to carry endwise a length of tubing, a two-part welding-shoe adapted to embrace and guide the tubing while traveling with said conveyer, a yielding contact device having a contacting face-configuration adapted to make extremely limited-area contact with a length of tubing at two points simultaneously, at points on each side of a longitudinal seam-cleft in the tubing, and means for conducting heating current from a suitable source of supply through said yielding contact device to the tubing at said limited points of contact only.

20. In an apparatus for electrically welding tubing, the combination of a main frame, an endless-chain conveyer mounted to travel thereon and having projections adapted to engage a length of tubing and positively to advance the same endwise, a bridging contact device adapted to make simultaneous two-point contact with the tube closely adjacent to, and on opposite sides of, the seam-cleft thereof, and means for sending current from said bridging contact device through the engaged part of the tube while it is traveling.

JOHN F. GAIL.
OTTO RUDD.

Witnesses:
  GEO. B. KNEPPER,
  FRANK LITEBRO.